April 2, 1968  E. H. VON HOEVEL  3,375,898
MUFFLER WITH PERFORATE CHORDAL BAFFLES DEFINING
FIBER-FILLED CHAMBERS Filed July 15, 1966  2 Sheets-Sheet 2

INVENTOR.
Edmund H. von Hoevel
BY
Webb Burden Robinson & Webb
HIS ATTORNEYS

United States Patent Office 3,375,898
Patented Apr. 2, 1968

3,375,898
MUFFLER WITH PERFORATE CHORDAL BAFFLES DEFINING FIBER-FILLED CHAMBERS
Edmund H. von Hoevel, Export, Pa., assignor to Hanlon & Wilson Company
Filed July 15, 1966, Ser. No. 565,523
5 Claims. (Cl. 181—40)

This invention relates to a muffler for exhaust gases from an internal combustion engine, and more particularly to a muffler for two-cycle, four and six cylinder horizontal opposed engines, such as those used for aircraft.

Heretofore mufflers for internal combustion engines, especially low horsepower four and six cylinder horizontal opposed engines for aircraft caused substantial amounts of horsepower losses during operation of the engines. The losses in horsepower results from high back pressures of the exhaust gases in conduits which conveyed these gases from the individual cylinders of the engine to the mufflers and/or from the back pressures of the exhaust gases in the mufflers themselves. In addition to causing horsepower losses, the back pressure also shortens engine life by driving exhaust gases back into the cylinders of the engines during portions of operation of same.

My invention provides a muffler which generates only a small amount of back pressure and thereby avoids losses in engine horsepower and shortened engine life. For example, in a 45 horsepower, 2-cycle, 4 cylinder horizontal opposed engine for aircraft, the power loss at maximum power due to my muffler is only about 7%. Specifically, my muffler comprises a duct member which is closed at each end. Disposed within the duct member are first and second baffles which extend substantially longitudinally of the duct member and are spaced apart from each other to form within this duct member a central chamber. Each baffle is also spaced apart from an interior longitudinal side wall of the duct member to form with the side wall a lateral space. In each lateral space there are fibers which substantially fill the space and which are made from a material able to withstand temperatures at least about 400° F. Each baffle has a plurality of holes extending therethrough. At least one exhaust gas conduit extends through the duct member into the central chamber, with a portion of the conduit disposed within the central chamber. This gas conduit is adapted to be connected to flows of exhaust gases from a cylinder of an internal combustion engine and is so disposed that the longitudinal axis of the portion is substantially transversely of the longitudinal axis of the central chamber. The walls of the portion are spaced apart from and substantially opposite the first and second baffles and have a plurality of holes extending therethrough. These holes are substantially opposite those holes in the baffles. Extending through the duct member and opening into the central chamber is a gas removal tube which conveys the exhaust gases from the muffler.

In one embodiment of the muffler, the portion of the exhaust gas conduit within the central chamber extends from one wall of the duct member towards an opposite wall thereof and terminates in an opening positioned adjacent to but spaced apart from the opposite wall of the duct member.

In the accompanying drawings, I have shown a prefered embodiment of my invention in which.

Figure 1:
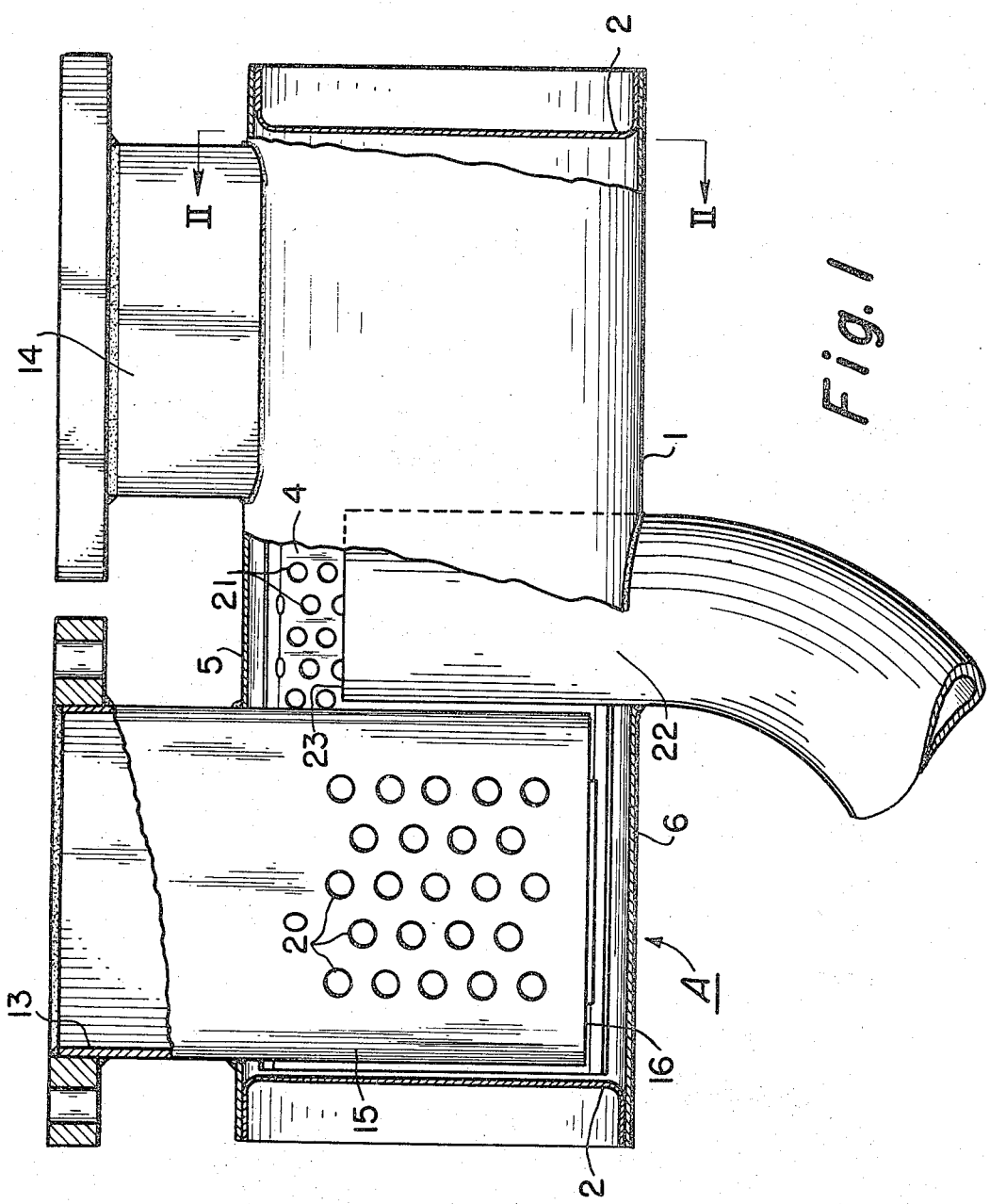
FIGURE 1 is a side elevational view, partly in section, of a muffler for a 4-cylinder, 2-cycle horizontally opposed engine.
Figure 2:
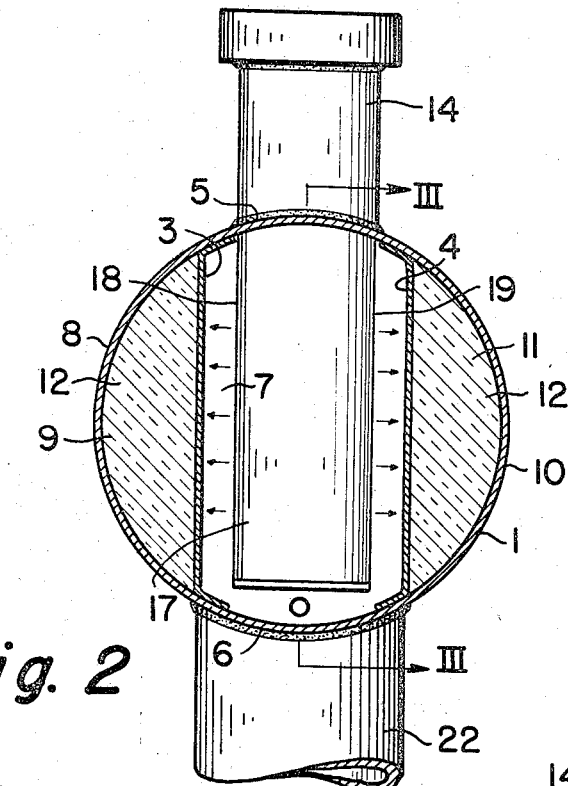
FIGURE 2 is a section view along the line II—II of FIGURE 1.
Figure 3:
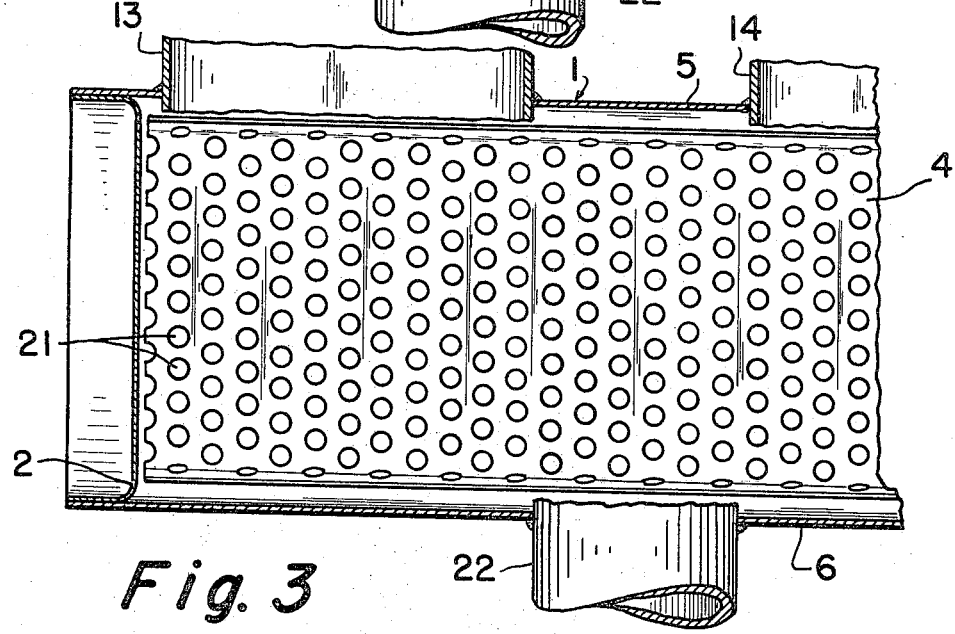
FIGURE 3 is a fragmentary section view along the line III—III of FIGURE 2.

Referring to FIGURES 1-3, the muffler A receives exhaust gases from two cylinders on one side of a 4-cylinder, 2-cycle horizontal opposed engine (not shown), and a second muffler (not shown) identical to muffler A is located on the opposite side of the engine and handles the exhaust gases from the other two cylinders of the engine. The muffler comprises a duct member 1 which is closed at each end by a header 2 welded to the duct around its interior peripheral end.

Extending between the two headers are two baffle plates 3 and 4 which are spaced apart from each other to form with the upper longitudinal wall 5 and the lower longitudinal wall 6 of the duct member 1 a central chamber 7. As shown, baffle plate 3 is spaced apart from the side wall 8 of the duct member and extends between the upper and lower left-hand parts of the duct member to define a first lateral space 9. Likewise, the baffle plate 4 is spaced apart from side wall 10 of the duct member, and extends between the upper and lower right-hand part of the duct walls to define a second lateral space 11.

Fibers 12 made from glass fill each lateral space, however any other suitable material for the fibers, such as asbestos, minerals, etc., may be used, provided that the material will withstand temperatures at least as high as 400° F. Preferably, the fibers are chemically inert to the exhaust gases which traverse the muffler.

The exhaust gases from one cylinder (not shown) of the engine travel through a first gas conduit 13 to the muffler A, and exhaust gases from a second cylinder (also, not shown and on the same side of the engine), flow through a second gas conduit 14 to the muffler. The two conduits 13 and 14 extend through the upper wall 5 of the duct member 1 into the central chamber 7, and the conduit 13 has within the central chamber 7 portion 15 which projects from the upper wall 5 towards the lower wall 6. This portion 15 terminates in an opening 16 adjacent to but spaced apart from the lower wall 6.

The conduit 14 has a portion 17 which is also interior of the central chamber 7 and is identical to the portion 15 of conduit 13. The two portions 15 and 17 are in longitudinal alignment and are so positioned within the central chamber that their central longitudinal axes are perpendicular to the longitudinal axis of the central chamber.

As shown in FIGURES 1 and 2, the walls 18 and 19 of the portions 15 and 17 are spaced apart from the baffle plates 3 and 4 and have holes 20 therethrough which are substantially opposite holes 21 which extend through the baffle plates 3 and 4.

Interposed between the two portions 15 and 17 of the gas conduits 13 and 14 within the central chamber 7 is an exhaust pipe 22 which projects through the lower wall 6 of the duct member 1 towards its upper wall 5 and terminates below this upper wall in an opening 23 located in the upper part of the chamber 7. This pipe conveys exhaust gases from the muffler to the atmosphere.

In traverse through the muffler, the exhaust gases enter it through the conduits 13 and 14 and escape therefrom into the central chamber 7 through the terminal openings 16 and the holes 20 through the conduit walls 18 and 19. A part of the exhaust gases, especially those which flow through the conduit holes 20, travel through the baffle holes 21 into the glass fibers 12, and then from the fibers back through the baffle holes 21 to the exhaust pipe 22. Of course, a portion of the exhaust gases does not penetrate the baffle plates into the glass fibers, but find their way directly to the exhaust pipe.

The glass fibers and the baffle holes play an important role in suppression of sound of the exhaust gases and in limiting the amount of back pressure of the exhaust gases to a small amount. Also, the arrangement of the portions 15 and 17 of the gas conduits 13 and 14 relative to the baffles 3 and 4 and to each other contribute to suppression of sound and limiting the amount of back pressure.

Preferably, the composition of the muffler components, such as the duct member, headers, baffle plates, exhaust gas conduits and exhaust pipe are made from stainless steels. However, other suitable metals may be employed, especially those resistant to corrosive attack from the gases and those which withstand temperatures 400° F. and higher.

My muffler has important advantages which include simplicity in design, ease of assembly, low cost, reliability in service, substantial service life and ability to effectively suppress noise without forming substantial amounts of back pressure.

While I have shown and described a preferred embodiment of my invention, it may be otherwise embodied within the scope of the appended claims.

I claim:
1. A muffler comprising:
  (a) a duct member closed at each end;
  (b) first and second baffles disposed within said duct member, extending substantially longitudinally thereof and being spaced apart from each other to form within said duct member a central chamber;
  (c) each said baffle being spaced apart from an interior longitudinal side wall of said duct member to form with said side wall a lateral space;
  (d) each said lateral space being substantially filled with fibers made from a material which withstands temperatures at least about 400° F.;
  (e) each said baffle having a plurality of holes extending therethrough;
  (f) at least one exhaust gas conduit extending through said duct member into said central chamber, with a portion thereof disposed within said central chamber;
  (g) the longitudinal axis of said portion being substantially transversely of the longitudinal axis of said central chamber;
  (h) the walls of said portion being spaced apart from and substantially opposite said first and second baffles;
  (i) said portion having a plurality of holes extending therethrough which are substantially opposite said baffle holes;
  (j) said exhaust gas conduit being adapted to be connected to flows of exhaust gas from a cylinder of an internal combustion engine; and
  (k) a gas removal tube extending through said duct member into said central chamber and having an opening into said central chamber for conveying said exhaust gas from said muffler.

2. The muffler of claim 1 wherein said portion of said exhaust gas conduit extends within said central chamber from one wall of said duct member towards an opposite wall thereof and terminates in an opening positioned adjacent to but spaced apart from said opposite wall of said duct member.

3. The muffler of claim 1 wherein a second exhaust gas conduit extends through said duct into said central chamber with a portion thereof disposed within said central chamber, being identical to said portion of said first-mentioned exhaust gas conduit and being adapted to be connected to flows of exhaust gas from a second cylinder of said engine.

4. The muffler of claim 1 wherein said two portions of said two exhaust gas conduits are substantially in alignment within said central chamber.

5. The muffler of claim 2 wherein a second exhaust gas conduit extends through said duct into said central chamber with a portion thereof disposed within said central chamber, being identical to said portion of said first-mentioned exhaust gas conduit and being adapted to be connected to flows of exhaust gas from a second cylinder of said engine.

References Cited
UNITED STATES PATENTS

| | | | |
|---|---|---|---|
| 2,078,754 | 4/1937 | Day | 181—40 |
| 2,361,133 | 10/1944 | Sprouse. | |
| 2,660,258 | 11/1953 | Bourne et al. | 181—60 |

ROBERT S. WARD, JR., *Primary Examiner.*